United States Patent [19]

Hilliard

[11] Patent Number: 4,995,805

[45] Date of Patent: Feb. 26, 1991

[54] METHOD AND APPARATUS FOR INCREASING RADIANT HEAT PRODUCTION OF HYDROCARBON FUEL COMBUSTION SYSTEMS

[75] Inventor: John C. Hilliard, Ann Arbor, Mich.

[73] Assignee: Gas Research Institute, Chicago, Ill.

[21] Appl. No.: 315,428

[22] Filed: Feb. 24, 1989

[51] Int. Cl.$^5$ .............................................. F23Q 3/00
[52] U.S. Cl. ................................... 431/10; 431/2;
431/266; 219/121.49; 219/123; 219/121.59;
219/121.5; 219/121.52; 313/139; 313/231.51;
313/231.41; 315/111.41; 315/111.71
[58] Field of Search ..................... 431/2, 254, 263, 10,
431/266, 265, 264; 219/121.47, 121.49, 121.51,
121.52, 121.5, 121.59, 123; 313/139, 231.51,
231.41; 315/111.41, 111.71; 60/203.1, 39.826,
39.827

[56] References Cited

U.S. PATENT DOCUMENTS

| | | | |
|---|---|---|---|
| 2,862,099 | 11/1958 | Gage | 219/121.5 X |
| 3,007,072 | 10/1961 | McGinn et al. | 313/231.51 |
| 3,057,159 | 10/1962 | Benedict | 60/39.827 |
| 3,940,641 | 2/1976 | Dooley | 219/123 X |
| 4,163,891 | 8/1979 | Komatsu et al. | 313/231.41 X |
| 4,342,551 | 8/1982 | Browning | 431/10 |
| 4,355,262 | 10/1982 | Chan et al. | 315/111.11 |
| 4,421,970 | 12/1983 | Couch, Jr. | 219/121.5 X |
| 4,431,901 | 2/1984 | Hull | 219/121 |
| 4,577,461 | 3/1986 | Cann | 219/121.49 X |
| 4,620,080 | 10/1986 | Anata et al. | 219/121.52 X |
| 4,743,734 | 5/1988 | Garlanov et al. | 219/121.5 X |
| 4,764,656 | 8/1988 | Browning | 219/121.51 X |
| 4,766,351 | 8/1988 | Hull et al. | 315/240 |
| 4,797,087 | 1/1989 | Gitman | 431/10 |
| 4,866,240 | 9/1989 | Webber | 219/121.47 |

FOREIGN PATENT DOCUMENTS

| | | | |
|---|---|---|---|
| 1239460 | 6/1986 | U.S.S.R. | 431/2 |
| 1395746 | 5/1975 | United Kingdom | 313/231.41 |

OTHER PUBLICATIONS

J. C. Hilliard, "Methods of Improving Combustion by Electrical Means", (May 1980).
A. K. F. Chan et al., "An Electrically Efficient, Finely Tunable, Low-Power Plasma Generator", J. Phys. D. Appl. Phys., 13, 2309-20, (May 1980).
A. J. Harrison et al., "Flame Stabilization of Plasma Jets", Proc. Roy. Soc., London, 321, pp. 95-103, (Jul. 1970).
A. Balakrishnan et al., "Radiative Flame Cooling for Reduction of Nitric Oxide Emissions", Trans. of ASME, Jour. of Heat Trans., pp. 37-42, (Feb. 1974).
M. Kono et al., "The Effect of DC to 10 MHz Electric Field on Flame Luminosity and Carbon Formation", 18th Symposium (Iut.) on Combustion, The Comb. Lust., pp. 1167-1174, (Sep. 1981).

Primary Examiner—Carl D. Price
Attorney, Agent, or Firm—MacMillan, Sobanski & Todd

[57] ABSTRACT

A method and apparatus for increasing radiant heat production of hydrocarbon fuel combustion systems are provided. In one aspect, the apparatus includes a pair of spaced electrodes through which a hydrocarbon fuel gas is flowed. An electrica arc is struck across the electrode gap to pyrolyze a portion of the hydrocarbon fuel gas, leading to the formation of carbonaceous heat radiative bodies which are entrained in the hydrocarbon fuel gas stream. In the presence of an oxidant gas such as air, a turbulent diffusion flame is created having an increased luminous radiant heat output, an improved turn-down ratio, increased flame stability, and reduced nitric oxide emissions. The method and apparatus are particularly adapted to increasing the luminous radiant output of hydrocarbon fuels having a low carbon-to-hydrogen ratio such as natural gas. In another aspect, a method and apparatus are provided by which the accumulation of pyrolytically formed carbonaceous bodies on an electrode during the pyrolysis of a hydrocarbon gas is effectively prevented by a secondary gas jet. In still another aspect, the present invention provides a method and apparatus for controlling the rate at which heat-radiative carbonaceous particles in a diffusion flame are oxidized by introducing a protective sheath of non-oxidant gas as a tertiary flow circumferentially around a stream of fuel gas having entrained heat-radiative carbonaceous particles. Various modification of these methods and apparatus are also provided.

46 Claims, 8 Drawing Sheets

METHOD AND APPARATUS FOR INCREASING RADIANT HEAT PRODUCTION OF HYDROCARBON FUEL COMBUSTION SYSTEMS

FIELD OF THE INVENTION

The present invention relates to combustion systems which utilize fuels, preferably gaseous hydrocarbon fuels, to produce heat. More specifically, the present invention provides a method and apparatus for increasing the radiant heat output of a combustion flame in which the flame is seeded with plasma-generated, heat-radiative particles that are substantially oxidized in the flame region.

BACKGROUND OF THE INVENTION

Combustion systems in which a hydrocarbon fuel is oxidized to liberate energy in the form of heat have been studied extensively in order to optimize heat production and heat transfer. Those skilled in the art will appreciate that efficient energy utilization and pollution control are primary considerations in the design and operation of combustion devices. One conventional type of combustion burner includes a nozzle through which a fuel gas is flowed. At the nozzle discharge opening, the fuel and an oxidant gas, typically air, associate to form a combustible mixture. When this mixture is ignited, a self-sustaining oxidation reaction (combustion) is initiated which continues so long as the supply of reactants, the requisite ignition temperature and flame stability conditions are maintained. Since the fuel gas and the oxidant are not truly pre-mixed, this arrangement produces a diffusion flame in which oxidation occurs at the interface of the two reacting gases. Depending on the nature of the fuel and oxidant gases, various combustion products are produced. In those instances in which a fossil fuel is combusted in air, the hot, rapidly-expanding combustion gases predominantly comprise carbon dioxide, water vapor, and nitrogen, along with carbon monoxide, hydrogen, oxygen, hydrocarbons, nitric oxides and a host of other materials in trace amounts.

Since the primary object of most combustion systems is to provide a source of thermal energy, numerous configurations of combustion chambers and heat exchangers have been devised. As will be known to those skilled in the art, heat liberated by a combustion flame is transferred to the walls of a combustion chamber by two primary modes of heat transfer, convection and radiation. As the hot combustion gases move through the reaction apparatus, they contact heat transfer surfaces thereby directly transferring heat. In addition, heat is transferred by thermal radiation, a process which increases in significance as flame temperature and/or flame luminosity rises. As will be appreciated by those skilled in the art, radiative heat transfer occurs through both luminous and non-luminous processes. In luminous radiative heat transfer, bodies such as soot and other particles which are entrained or form in the flame radiate heat across a broad band of the infra-red spectrum, with a small fraction radiated in the visible part of the spectrum. In contrast, non-luminous radiative heat transfer comprises infrared emissions from hot combustion products, typically carbon dioxide and water vapor.

As will be explained more fully hereinafter, the present invention deals principally with the luminous component of radiative heat transfer. Fuels which have a high carbon-to-hydrogen ratio such as fuel oils and the like produce a substantial amount of soot during combustion. This production of soot significantly enhances radiative heat transfer. Conversely, those fuels having low carbon-to-hydrogen ratios such as methane which is the predominant constituent of natural gas, produce only minimal amounts of soot and thus have diminished luminous heat-radiative capacities. These fuels do, however, have higher non-luminous radiant output due to the increased production of water vapor during combustion. It has been determined that a general correlation exists between the luminous radiant output of a combustion flame and the carbon-to-hydrogen ratio of the fuel. As the carbon content of the fuel increases, the luminous radiant output of the flame increases due to an increase in soot production. In the present invention, this empirical relationship between carbon content of the fuel and luminous radiative heat transfer is circumvented.

The precise mechanism by which carbon particles form in diffusion flames is not well understood even though a significant amount of research has been conducted on this phenomenon. One theory holds that positively charged carbon ions are formed in a pyrolysis zone which serve as nuclei for carbon growth. Carbon particles may then associate to form larger aggregates of various sizes and shapes. It has been suggested by others that radiant heat transfer from flames can be controlled by regulating the residence time of naturally-formed carbon particles in the pyrolysis zone of diffusion acetylene flames with an electric field ("The Effect of DC 10 MHz Electric Field on Flame Luminosity and Carbon Formation", Eighteenth Symposium (International) on Combustion, the Combustion Institute (1981)). It will also be appreciated by those skilled in this art that although reduced carbon particle formation during the combustion of, for example, natural gas and other gases have low carbon-to-hydrogen ratios makes these fuels desirable from an environmental standpoint (lower particulate stack emissions), their reduced radiative capacity is a serious detriment. It would therefore be desirable to provide a means by which the heat radiative capacity of fuels having low carbon-to-hydrogen ratios could be enhanced, most preferably without increasing particulate stack emissions. It would be even more desirable to do so in a manner by which nitric oxide emissions could be reduced.

In order to increase the number of radiative bodies in a combustion flame, others in the past have preheated combustion fuel and/or oxidant gas. However, it has been determined that this technique requires temperatures in excess of 700 degrees C. for any significant particle formation to occur. The introduction of additives to a combustion flame has been attempted such as the addition of sulfur trioxide, chlorinated hydrocarbons, inorganic salts, titanium tetrachloride, fluorocarbons, and various other gases. For a number of reasons, these prior art methods have proven to be of little practical value. Most significantly, the cost of the flame additives increases the operational expense of the combustion system and often produces undesirable pollutants. The addition of carbon particles from an external source to the combustion flame has also been tried with limited success due to the inability to accurately control particle size. Moreover, triboelectric effects cause the carbon particles to agglomerate to sizes which cannot be fully burned in the combustion chamber and which do not attain high radiative temperatures due to the increased thermal inertia of large particles. These carbon agglomerates are then expelled in the exhaust gases. Particle agglomeration due to triboelectric charging has been observed even with submicron carbon particles. Furthermore, while the addition of carbon particles from an external source has provided some increase in radiant heat transfer, the resultant increase in stack emissions, the deposit of carbon on heat transfer surfaces (the latter operating to reduce heat transfer), and the relatively large particles which are produced are all serious detriments to conventional particle injection or precracking processes.

It is also known that hydrocarbon fuel gases such as natural gas and methane ca be decomposed pyrolytically in an electric arc of appropriate electrical characteristics. Gas plasmas formed by ionizing an inert gas such as argon have been studied extensively, primarily for their ability to generate extremely high temperatures which may exceed 10,000 degrees C. In these devices a gas or mixture of gases is flowed through an electric arc that is generated between a pair of spaced electrodes. Although the precise mechanism by which a gas plasma is formed is not fully understood, it is clear that gas molecules are ionized, forming positive and negative ions, and electrons which are accelerated toward the electrodes. The accelerated particles collide with other gas molecules which then also disassociate. In this manner, a plasma of ions, free radicals, and energetic electrons is formed. Although research has been conducted on the use of reactive gases to form gas plasmas, very little work has been done with natural gas.

One prior art electric arc apparatus which is particularly efficient when used to create a plasma of a gaseous feedstock is disclosed in U.S. Pat. No. 4,355,262 entitled, "ELECTRIC ARC APPARATUS," which is incorporated herein by reference. Therein, there is provided an apparatus for treating a material in an electric arc. The device includes a rod-shaped cathode having a flat end coaxially disposed in a converging throat portion of an annular anode. An annular gap is provided between the cathode and anode through which a stream of gas such as argon is flowed. An electric arc spanning the gap is initiated between the electrodes. Means such as magnetic field generating means is provided to produce movement of the arc along a predetermined path on the anode and the cathode. That is, the ends of the arc rotate about predetermined paths on the anode and the cathode. In this fashion, electrode erosion is significantly reduced.

In the above-mentioned patent disclosure the use of an electric arc device to generate active species from non-flammable gases for injection into a combustion apparatus is disclosed. It is postulated therein that pollution removal could be carried out, for example soot removal by oxidation or electric modification of the soot forming process by material injected from the electric arc device. It is also stated that this would increase the rate of oxidation of the soot and/or modify its electrical surface properties and hence aggregation characteristics, thus facilitating its removal from combustion products. It is further stated that combustion enhancement can be achieved in this manner by injecting hydrogen or nitrogen atoms to improve flame stability, provide ignition, and accelerate combustion in fuel-lean mixtures while decreasing pollution. This prior art device was developed to eliminate the need for argon in the gaseous stream. While the device is capable of generating an arc in a hydrocarbon gas without the use of argon, it was recognized by the present inventor that the device cannot operate for longer than two minutes due to the formation of a carbon pinnacle on the end of the cathode. As will be explained more fully herein, this carbon pinnacle, being at cathode potential, provides a migration path for the cathode spot, destabilizing the device. Moreover, the carbon pinnacle obstructs the anode orifice causing destabilization and extinguishment. The problem of carbon pinnacle formation is solved in the present invention. Also, it is disclosed that the prior art device could possibly be used intermittently on a hydrocarbon feedstock as an ignition source in a jet engine.

Therefore, it would be desirable to provide a combustion apparatus which utilizes an electric arc to generate carbon particles pyrolytically in a continuous flow of, for example, burning natural gas with the carbon particles serving as heat radiative bodies in a sustained combustion flame. Ideally, an apparatus of this nature would also provide a combustion flame which is stable over a wide range of fuel velocities and which would provide reduced nitric oxide emissions by radiative cooling of the flame produced by these heat-radiative bodies. It is to this end that the present invention is directed.

SUMMARY OF THE INVENTION

In accordance with the present invention, there is provided in one aspect an apparatus for generating thermal energy which produces a large radiant heat component in the combustion of gaseous hydrocarbon fuels having low carbon-to-hydrogen ratios. In one embodiment, the apparatus includes a pair of spaced electrodes arranged such that a gap is defined across which an electric arc is established. A means for conveying a hydrocarbon fuel as a gaseous stream through the gap is provided wherein heat from an ensuing combustion flame is liberated. The apparatus permits a small portion of the fuel stream to be pyrolized by the electric arc. The ionization of the fuel gas produces a gas plasma in which heat radiant bodies are pyrolytically formed. These heat radiant bodies provide a substantial increase in the luminous radiant heat output of the combustion flame which may then be transferred to a surface to be heated. The invention apparatus demonstrates an improved turn-down ratio and lower nitric oxide emissions over conventional devices. The "turn down ratio" is the ratio of the maximum to minimum throughput without flame lift-off or flame-out. In one embodiment, combustion is carried out in a combustion chamber having heat transfer surfaces. In another embodiment, heat is transferred directly to a material to be thermally processed.

In a preferred embodiment, the spaced electrodes comprise a cathode in axial arrangement with an annular anode. In this configuration, the fuel gas is flowed around the cathode in a space which leads into the central bore of the anode. A portion of the flowing hydrocarbon gas thus passes through the arc between the spaced electrodes which causes a portion of the fuel to ionize. The resulting gas plasma reacts in this pyrolysis zone, forming carbonaceous, heat radiative bodies of particle size. These heat radiative bodies are entrained in the flow of hydrocarbon gas. The hydrocarbon gas stream with the entrained particles flows through the central bore of the anode. Means for introducing an oxidant gas surrounding the gas stream issuing from the anode bore is provided by which the oxidant and hydrocarbon gases associate. The gases are ignited at their interface to produce a turbulent diffusion combustion flame in which the heat radiative bodies enhance the luminous heat radiation of the flame. The arc struck across the electrodes is preferably in motion about the electrode surfaces to reduce electrode erosion. As will be explained more fully, the combustion apparatus of the present invention is particularly useful for optimizing radiative heat transfer of natural gas turbulent diffusion flames.

In another aspect, the present invention provides a combustion burner having a plasma generator and means for preventing the deposit of pyrolytically formed substances on the electrode surfaces. The burner is preferably used in association with heat radiative enhancement as disclosed by the present invention in connection with a heat recovery system or for thermally processing materials. In one embodiment, the combustion burner includes a pair of spaced electrodes which define an arc gap across which an electric arc is established. Hydrocarbon gas conveying means is provided by which a hydrocarbon gas is flowed into the region of the arc gap. At least one passage is provided through which a secondary stream of gas is flowed to impinge upon the surface of at least one of the electrodes, thereby preventing any substantial build up of pyrolytically formed substances on the electrode. In a preferred arrangement, the combustion burner includes a cathode and an annular anode appropriately spaced to define an arc gap. An annulus surrounding the cathode serves as a passage for a primary flow of a hydrocarbon fuel gas. The cathode is disposed in axial, and preferably coaxial, alignment with the annular anode. In one embodiment, a channel extends through the anode body and terminates at an outlet directed toward the plane surface of the cathode. In those configurations in which a portion of the cathode is coaxially disposed in a portion of the central bore of the anode, this channel preferably extends radially through the anode body, terminating at an outlet in communication with the anode bore and directed toward the cathode surface. In an alternative embodiment, the deposit of pyrolytically formed substances is prevented by utilizing a carbon cathode.

In still another embodiment, an improved electric arc device is disclosed by which reactive materials may be ionized to form a plasma stream without producing a deviation of the original arc gap distance. The improved electric arc apparatus includes a conventional two-electrode plasma generator which is modified to provide means by which the accumulation of pyrolytically formed substances on the electrodes is prevented. In a preferred embodiment, a gas jet passage is provided in association with the electrodes to produce a high-velocity stream of gas incident on the surface of at least one of the electrodes. Alternatively, a carbon electrode may be utilized to prevent this unwanted accumulation. In this manner, the device permits a primary flow of a material through the electrode gap for ionization, while any potential deposit of charged species on the electrode is prevented. In one arrangement, the gas jet passage is provided through a channel or bore in an annular anode having a converging throat in coaxial alignment with a rod-shaped cathode. In this configuration, the gas jet passage is most preferably in flow communication with the central bore of the anode.

The present invention also provides a combustion system in which the residence time of heat-radiative, oxidizable particles may be regulated and nitric oxide emissions are reduced. In one aspect, the combustion system includes a plasma generator by which heat radiative particles are generated. Alternatively, the combustion system controls the residence time of particles produced by the pyrolytic action of the combustion flame. In a preferred arrangement, the combustion system includes an annular outlet circumferentially disposed around the combustion flame through which a hydrocarbon gas is flowed. By providing a source of fuel downstream of the burner nozzle, premature oxidation of heat radiative particles is reduced, thereby enhancing thermal transfer from the flame and reducing nitric oxide emissions. This combustion system is more preferably utilized in connection with one or more of the aforementioned heat radiation enhancement devices.

The present invention also provides a number of methods by which the radiant heat production of a combustion flame can be enhanced. The inventive methods are particularly useful in the combustion of natural gas. Accordingly, a method is provided in which heat radiative bodies are generated at a controlled rate by electric arc pyrolysis of a portion of a primary fuel stream. The heat radiative bodies are entrained in the fuel stream which is directed through a nozzle orifice. An oxidant gas is supplied which surrounds the fuel stream as the fuel stream exists the nozzle. At the interface of the fuel and the oxidant gas, the fuel molecules associate with the oxidant gas to form a combustible mixture. Ignition of this mixture occurs in the known manner to create a turbulent diffusion flame. The presence of the heat radiative bodies in the combustion flame enhances the luminous radiant emission of the turbulent diffusion flame. Combustion intensity and flame stability are also increased. The combustion reaction may be carried out in a combustion chamber with the radiant and convective heat components of the flame being transferred to heat transfer surfaces. Alternatively, the combustion reaction generates heat which is transferred directly to a material to be thermally processed.

In another aspect, the present invention provides a method by which radiant heat production of a combustion flame is increased by electric arc generation of heat radiative bodies which includes the step of preventing the deposit of pyrolytically-formed substances on the plasma generating electrodes. This is achieved by flowing a primary stream of a hydrocarbon fuel through an electric arc such that a portion of the fuel stream is pyrolized to form heat radiative bodies entrained in the fuel stream. Heat radiative bodies which would otherwise accumulate on an electrode are mobilized in the primary fuel stream by directing a secondary stream of gas toward the electrode surface. This secondary jet of gas may comprise a hydrocarbon fuel. In a preferred embodiment, the electrode assembly comprises an annular anode spaced a predetermined distance from a plane-ended cathode with the secondary gas jet being directed to the cathode surface adjacent the anode. In one configuration, the secondary gas jet issues from a channel formed in the anode. Alternatively, a carbon electrode is utilized to prevent any substantial build-up of pyrolytically formed materials on the electrode.

In still another embodiment, the present invention includes a method of controlling the residence time of heat-radiant, oxidizable particles in a combustion flame.

The particles may be formed by plasma pyrolysis in accordance with the teachings of the present invention or by the pyrolytic action of the diffusion flame. Premature oxidation of the particles is prevented by introducing a flow of hydrocarbon fuel or other non-oxidant gas from an annular outlet circumferentially disposed around the combustion flame. This gas flow provides a more uniform temperature field from which the particles radiate and assists in reducing nitric oxide emissions. If desired, a more rapid oxidation of entrained particles may be attained by utilizing an oxidant in the circumferential gas flow. In a most preferred embodiment, the circumferential gas flow comprises a tertiary gas stream in a plasma-enhanced combustion system in which a secondary gas stream is provided as previously described to prevent the deposit of materials on the cathode.

In addition to these methods for enhancing and controlling combustion systems, the present invention provides an improved method of treating a material by electric arc pyrolysis. In substance, the method prevents the formation of pyrolytically formed particles on the arc electrodes by directing a gaseous stream to the surface of the electrode upon which the deposit would otherwise form, or, alternatively, by utilizing a carbon electrode.

DESCRIPTION OF THE PREFERRED EMBODIMENTS

Figure 1:
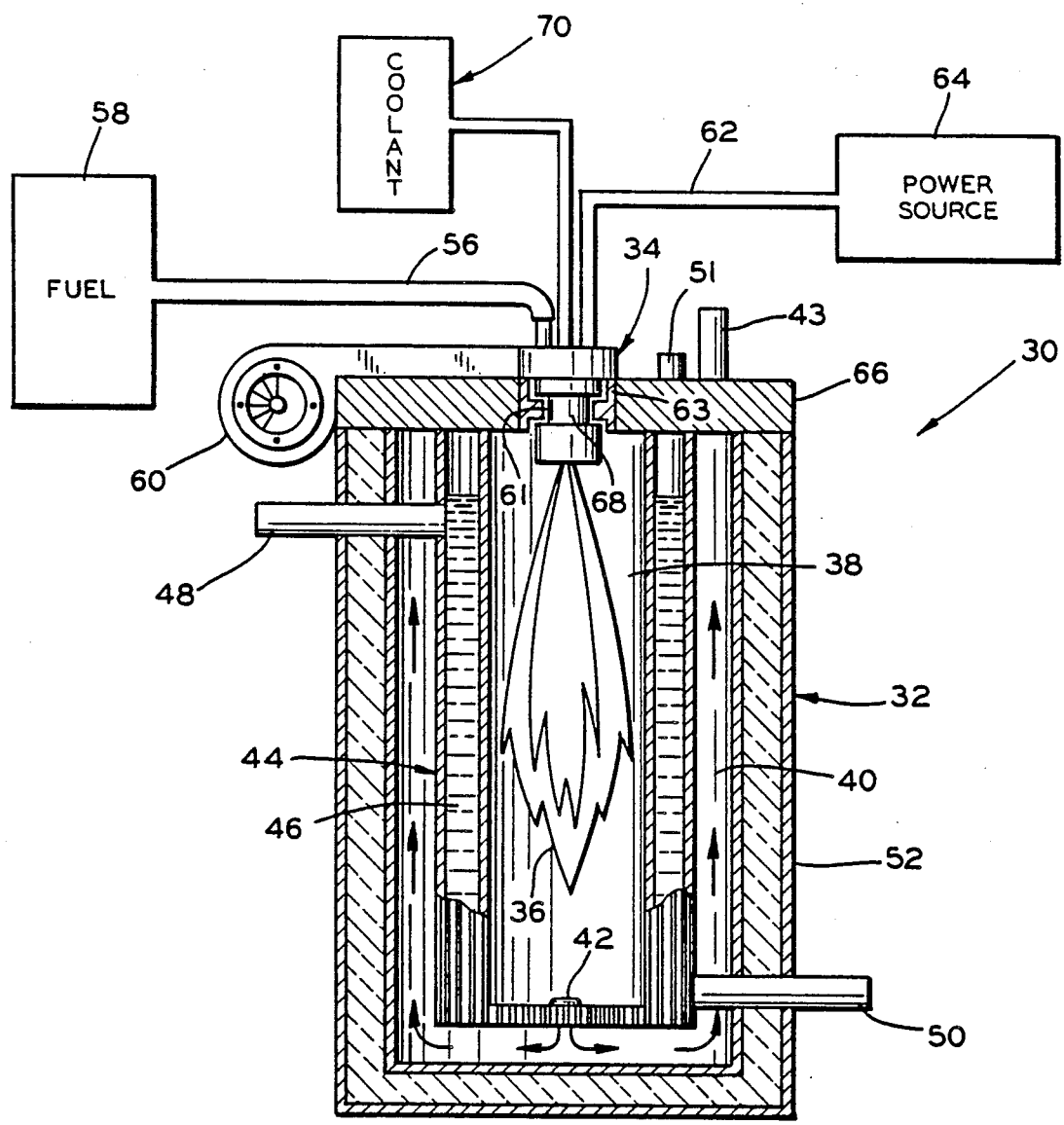
FIG. 1 illustrates a partially diagrammatic cross-section of a plasma-assisted combustion system in accordance with the present invention.

Referring now to the drawings, in which like reference numerals designate like parts, and, more specifically, with reference to FIG. 1, combustion apparatus 30 is shown generally having combustion unit 32 which defines a series of chambers in the conventional manner. In this embodiment, combustion unit 32 is in the nature of a steam boiler which is top-fired by plasma-assisted combustion burner 34. Turbulent diffusion flame 36 issues from plasma-assisted combustion burner 34 and extends into combustion chamber 38. The high-temperature, rapidly expanding combustion gases move from combustion chamber 38 to annular flue passage 40 by way of port 42 and are vented from annular flue passage 40 through flue outlet 43. Heat exchange jacket 44 is seen having annulus 46 through which a suitable heat exchange medium such as water is circulated during operation via pipes 48 and 50. In addition, heat exchange jacket 44 defines combustion chamber 38. In order to control the pressure inside annulus 46 a release valve 51 is provided. As will be appreciated by those skilled in the art, insulated shell 52 is provided to minimize heat loss from combustion apparatus 30. As will be explained more fully, plasma-assisted combustion burner 34 is supplied with fuel, preferably a gaseous fuel, through fuel supply pipe 56 which is connected to gas source 58. Similarly, an oxidant gas, preferably air, is supplied by blower 60 through annular oxidant gas passage 61 defined by oxidant gas supply housing 63 of plasma-assisted combustion burner 34. Contained within conduit 62, electrical leads (not shown) interconnect plasma-assisted combustion burner 34 with an appropriate power source 64. Plasma-assisted combustion burner 34 is supported and retained in cap 66 of combustion unit 32 through opening 68. During operation, plasma-assisted combustion burner 34 is cooled by coolant circulation system 70. It should be appreciated that cooling of the burner 34 may be accomplished by the system 70 circulating a heat transfer liquid through the burner 34 or may be accomplished with either the combustion air and/or another separate flow of material gas to the burner 34.

It is to be understood that numerous devices similar to combustion unit 32 are suitable for use in the present invention and, as will be explained more fully, it is contemplated that plasma-assisted combustion burner 34 will be useful in the direct treatment of materials. Combustion unit 32 shown in FIG. 1 is merely one preferred construction, the principles of which will be well understood by those skilled in the art. Accordingly, heat generated by flame 36 is transferred to the heat exchange medium in passage 46 of heat exchange jacket 44 by radiant and convective heat transfer. To optimize convective heat recovery, combustion gases move through port 42 into flue passage 40 where they again contact heat exchange jacket 44. Heat loss from the system by parasitic cooling is minimized by virtue of insulated shell 52.

Figures 2, 3:
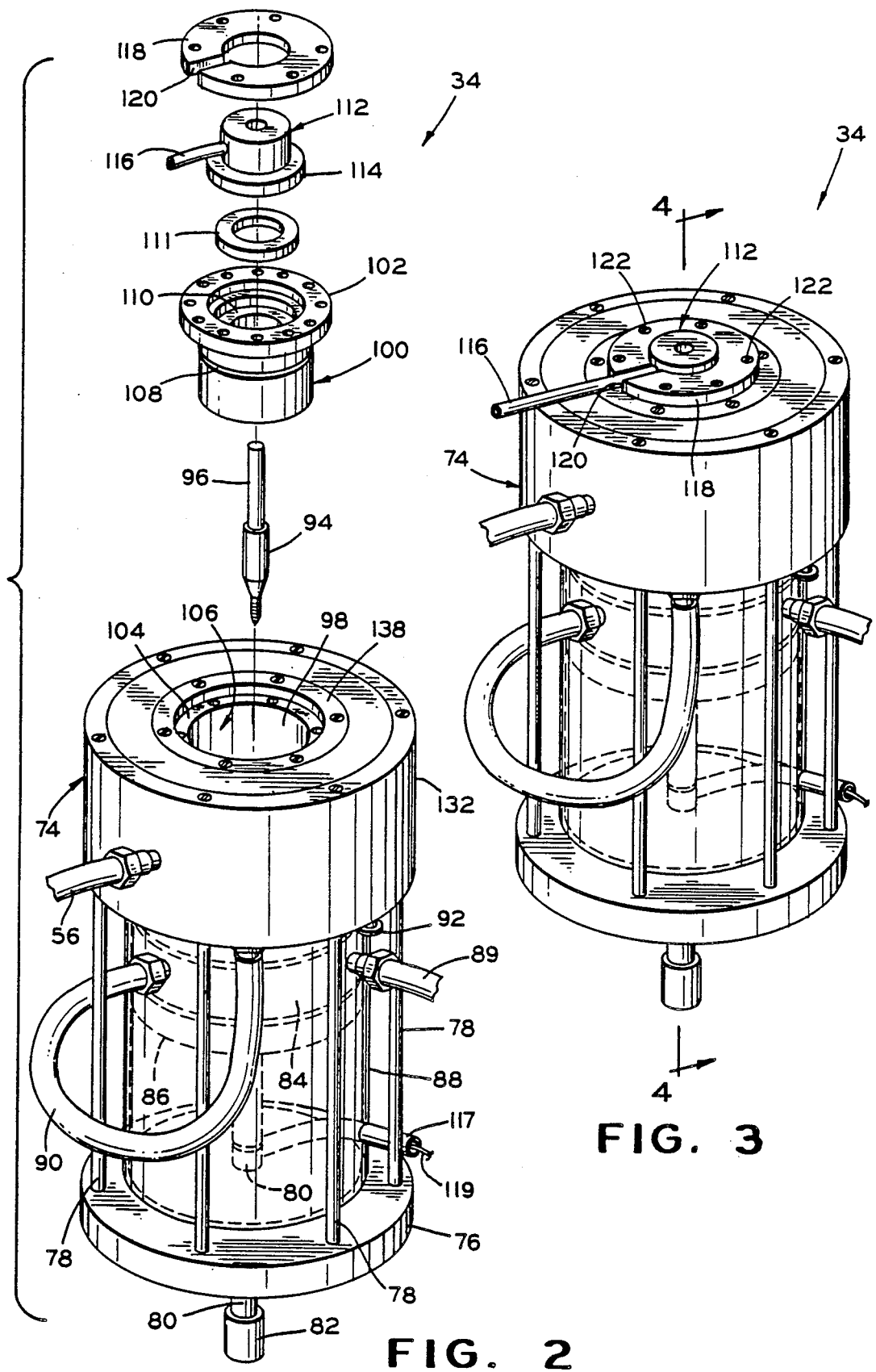
FIG. 2 is an exploded view of the plasma-assisted combustion burner of the present invention in one embodiment.
FIG. 3 is a perspective view of the plasma-assisted combustion burner of the present invention in one embodiment.

Referring now to FIGS. 2 and 3 of the drawings, plasma-assisted combustion burner 34 is shown in this embodiment having burner head 74 which is attached to base plate 76 by a plurality of posts 78. Extending through base plate 76, cathode push rod 80 is provided by which the inter-electrode spacing can be adjusted in a manner which will be described more fully herein. Knob 82 (not shown in FIG. 1) is preferably provided at one end of cathode push rod 80 in order to permit manual adjustment of inter-electrode spacing. In order to isolate the internal components of plasma assisted combustion burner 34 and to enclose annular coolant passage 84 of cathode push rod holder 86, cylindrical housing 88 is provided, which in this particular embodiment is formed of Plexiglas. At one end, cylindrical housing 88 abuts base plate 76 and at its other end abuts burner heat 74. As will be explained more fully, several components of plasma-assisted burner 34 are cooled during operation by circulating a suitable coolant through interconnected passages, one of which is coolant passage 84. Coolant is introduced into coolant passage 84 through coolant line 89. Coolant is removed from the network of coolant passages through a second coolant line (not shown) which is identical to coolant line 89 and which is also in flow communication with coolant passage 84. Accordingly, hose 90 is provided which links coolant passage 84 with similar coolant passages (not shown in FIGS. 1-3) inside burner head 74. In addition, a primary flow of fuel gas is introduced into plasma-assisted combustion burner 34 through fuel supply line 56.

Housed within burner head 74 is cathode holder 94 in which cathode 96 is rigidly secured. Closely received within central bore 98 of burner head 74 is anode support 100 having flange 102 which seats on shoulder 104 of anode housing 106. In order to ensure a substantially hermetic seal between anode support 100 and anode housing 106, an O-ring (not shown) is provided in groove 108 of anode support 100. In one embodiment of the present invention, anode support 100 is provided with an internal annular ledge 110 which supports annular magnet 111. The precise function of annular magnet 111 will be more fully described hereinafter. As shown best in FIG. 3 of the drawings, annular anode 112 is shown having flange 114 and, in this particular embodiment, a single integral secondary gas supply line 116. Post 92 is attached to burner head 74 which is in turn in electrical connection with annular anode 112 through the intervening structures (anode support 100 and anode housing 106). An electrical lead (not shown) is then attached to post 92 to electrically energize annular anode 112. Similarly, conduit 117 is provided through which electrical lead 119 extends in electrical contact with cathode push rod 80. In this manner, cathode 96, which is in electrical contact with cathode holder 94, is electrically energized. Both electrical leads extend through conduit 62 to power source 64, shown only diagrammatically in FIG. 1 of the drawings. In order to retain annular anode 112 on anode support 100, retaining collar 118 is provided having slot 120 to allow clearance for secondary gas supply line 116. A plurality of retaining screws 122 are used to mount retaining collar 118 on anode support 100.

Figure 4:
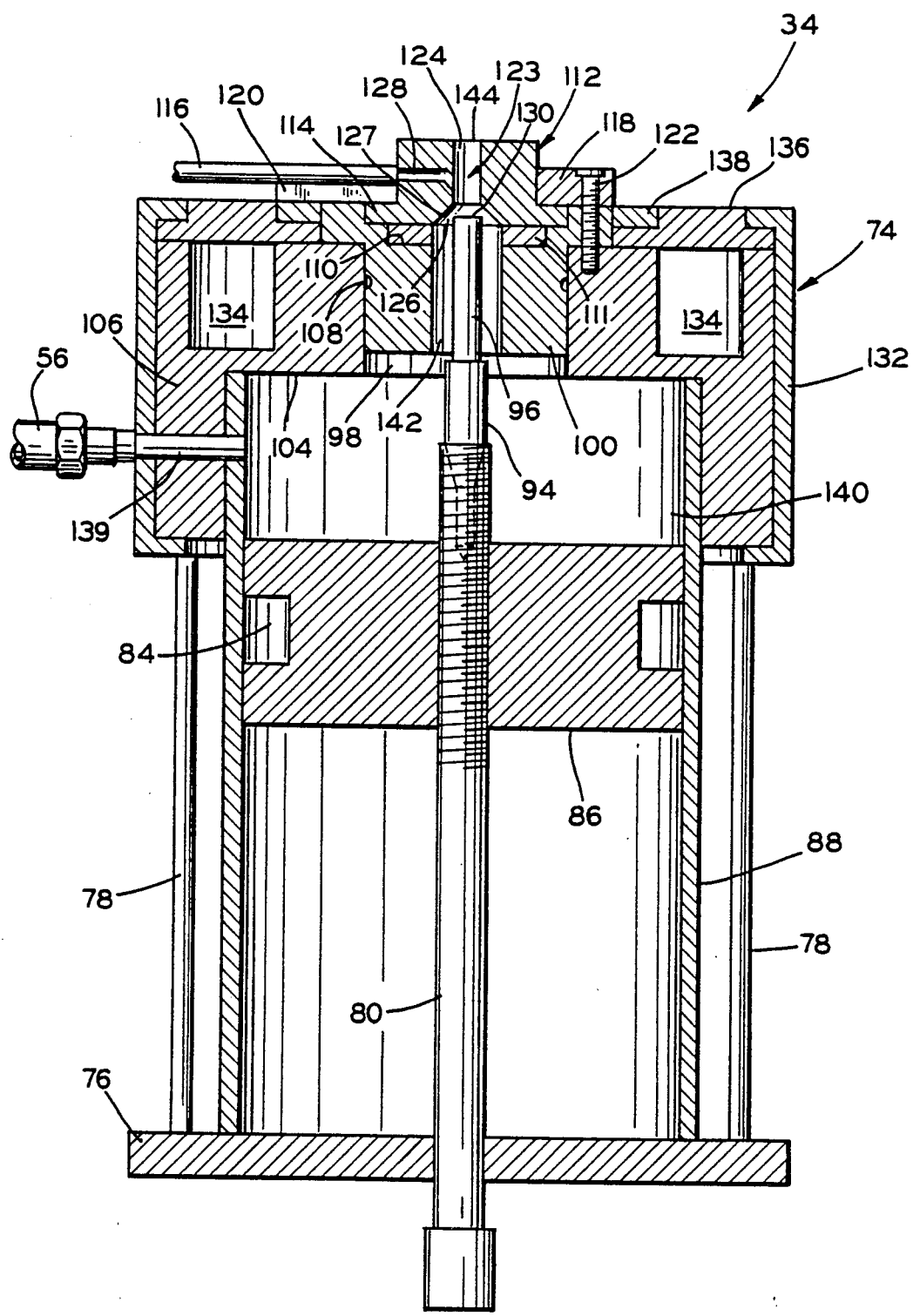
FIG. 4 is a cross-section along lines 4—4 of FIG. 3 of the plasma-assisted combustion burner of the present invention.

Referring now to FIG. 4 of the drawings, plasma-assisted combustion burner 34 is shown generally in cross-section having annular anode 112 secured in position on anode support 100 with retaining collar 118 and retaining screw 122. Annular anode 112 has a central bore 123 which comprises a straight bore portion 124 and a converging throat portion 126. It will be understood that converging throat 126 is defined by a converging or sloping portion 127 of the inner wall of annular anode 112. Secondary gas supply line 116 is shown in attachment with annular anode 112 at secondary gas bore or channel 128 which is in communication with the central bore of annular anode 112. The geometry of channel 128 is such that gas flowing therethrough exists into central bore 123 at an angle which is directed at plane-end 130 of cathode 96.

Underlying annular anode 112, and in coaxial alignment with cathode 96, annular magnet 111 is shown supported on anode support 100. In turn, anode support 100 is seated on shoulder 104 of anode housing 106. Anode housing 106 is secured in place in circumferential housing 132. For simplicity, oxidant gas supply housing 63 is not shown in FIGS. 2-4. As previously explained, burner head 74 is attached to base plate 76 by posts 78, two of which are shown in FIG. 4. In order to electrically isolate cathode 96 from annular anode 112, base plate 76 and cylindrical housing 88 are preferably formed of an electrically insulative material such as Plexiglas such that electrical conduction does not occur through intervening components.

The position of cathode 96 with respect to the converging portion 127 of annular anode 112 which defines converging throat 126 is clearly shown, and in this arrangement, comprises a substantially coaxial arrangement. Cathode 96 is held by cathode support 94 which is threaded at one end to be received in cathode push rod 80. As previously stated, cathode 96 is electrically energized through electrical lead 119 (not shown in FIG. 4). Annular coolant passage 84 of cathode push rod holder 86 and annular coolant passage 134 in anode housing 106 are shown. Annular coolant passage 134 is closed by annular cap 136 which is secured in position by circumferential housing 132 and a retaining ring 138. It should also be noted that channel 139 is also provided through anode housing 106 between the entry port of fuel supply line 56 and fuel chamber 140. Finally, in order to allow adjustment of the inter-electrode spacing between cathode 96 and annular anode 112, cathode push rod 80 is helically adjustable in push rod support block 86. It will also be understood that annular coolant passage 84 of cathode push rod support block 86 and annular coolant passage 134 of anode housing 106 are in communication by way of coolant line 90 and an appropriate channel (not shown) through anode housing 106. This allows coolant to be introduced via coolant line 89, into annular passage 84, through coolant line 90, and into annular coolant passage 134. Preferably, coolant leaves annular coolant passage 134 through a second channel (not shown) in anode support 106.

In connection with the method of the present invention in one embodiment, and referring now to FIG. 1 of the drawings, in operation, a fuel, preferably a gaseous fuel, and most preferably a hydrocarbon fuel having a low carbon-to-hydrogen ratio, is flowed from fuel source 58 through fuel supply pipe 56 into channel 139 of anode housing 106 where the fuel enters fuel chamber 140. Based upon the previous description of the characteristics of hydrocarbon fuels with respect to their ability to form carbonaceous particles and the effect of carbonaceous particles on luminous radiant heat output in turbulent diffusion flames, it should be clear that in this particular embodiment, the present invention provides significant advantages in the combustion of fuels such as natural gas. Natural gas has many desirable attributes, including economy and generally low pollution characteristics. However, in a conventional combustion burner, natural gas fails to produce a sufficient quantity of carbonaceous particles to achieve the desirable level of luminous radiant heat output. Therefore, in its most preferred embodiment, the present invention is operated using natural gas as the principal fuel source. In other aspects, the present invention is useful with a variety of fuels including higher hydrocarbon fuels, liquid fuels such as fuel oil, alcohol, kerosene and the like which can be easily vaporized when introduced into plasma-assisted combustion burner 34. Therefore, while the present invention is particularly adapted for use with hydrocarbon fuels having low carbon-to-hydrogen ratios, it is not restricted to these fuels.

Fuel moves from fuel chamber 140 through central bore 142 of anode support 100 and passes into converging throat 126 where a portion of the fuel is pyrolized in a manner to be described more fully. The fuel stream and the pyrolytically formed carbonaceous particles entrained therein move through straight bore passage 124 and exit at nozzle opening 144. In order to increase the number of carbonaceous particles which serve as luminous heat-radiative bodies in turbulent diffusion flame 36, an electric arc is established between cathode 96 and annular anode 112. In this particular embodiment, cathode 96 has a flat or plane-end 130. An electrical potential difference is established by the appropriate circuitry (not shown) to strike an arc across the gap between plane-end 130 of cathode 96 and annular anode 112. The arc will generally seek the shortest path between the two electrodes, and thus one end of the arc will contact annular anode 112 at portion 127. The arc can be struck in a number of ways which will be known to those skilled in art, such as through the use of a high-frequency oscillator or by simply decreasing the inter-electrode space by adjusting cathode push rod 80, striking the arc, and then retracting cathode 96 by re-adjusting cathode push rod 80 to lengthen the arc.

In the particular embodiment of the invention illustrated in FIG. 4 of the drawings, a plane-ended cathode is utilized. This arrangement provides significant advantages described in the foregoing United States Patent, "ELECTRIC ARC APPARATUS." More specifically, by providing a flat-ended cathode and a coaxially arranged magnet 111, the arc struck between cathode 96 and annular anode 112 is caused to rotate around the edge of plane-end 130 of cathode 36 as well as around the surface of annular anode 112. In other words, magnet 111 comprises an arc-moving means (note that other means for rotating the arc in this manner are disclosed in U.S. Pat. No. 4,355,262 which are suitable for use in the present invention and which are specifically incorporated herein by reference) which exerts a magnetic flux density (B) aligned along a generally longitudinal axis extending through bore 124 of annular anode 112. The magnetic flux density so generated is generally at right angles to the arc, thus causing arc rotation. The arc length—which is generally defined as the shortest distance between the point of the cathode spot on the rim of the plane-end 130 of cathode 36 and the converging surface of anode 112—is determined by the operating conditions. Most important in defining this length is the operating current and voltage, which is also mass flow rate dependent. Those skilled in the art will recognize that primary gas flow and arc rotation will tend to convolute the arc, thus changing its length. The convolution increases as the distance between the active surfaces of the electrodes increases. In one embodiment, the inter-electrode spacing is preferably in the range of 250 to 1000 microns. As will be recognized by those skilled in the art, the diameter of cathode 96 and anode 112 defines the flow area for primary flow. By increasing the diameter of cathode 96, while preferably maintaining the interelectrode spacing in the above-referenced range, the primary flow area can be increased. Although the interelectrode spacings quoted above are for one embodiment of the invention, careful matching of flow rates and operating conditions, most notably current and voltage, may enable operation outside these specific values.

In one embodiment, the following operating conditions are preferred: an operating voltage in the range of 60 to 120 volts with an operating current in the range of 5 to 30 amps. In the plasma-assisted combustion application, the total power is well approximated by the direct product of current and voltage. However, due to the well-known v-i behavior of arcs, maximum current generally occurs at minimum voltage. This leads to instantaneous power levels, based on the above values, of between 600 ($5 \times 120$) to 1800 ($60 \times 30$) watts. In one application with a total natural gas flame flow rate of between 1.5 to 2.25 kg/hr, the flow through passage 123 is preferably between 0.5 to 1.0 kg/hr. Values outside these ranges may be suitable in some applications.

As the fuel passes through the inter-electrode gap, a portion of it is pyrolized by the electric arc such that carbonaceous particles or "seed-particles" are produced. It is theorized that these particles begin as nuclei which then agglomerate to an optimum particle size of from 0.01 to about 0.05 microns as they exit nozzle opening 144. It is also theorized that these carbonaceous particles further aggregate the turbulent diffusion flame 36 to a size of about 0.05 to about 0.25 microns. The particle size determines in part the residence time of the heat-radiative bodies in the flame as well as the luminous radiant output characteristics of the particles. Particle size is a function of the chemical characteristics of the fuel and the arc characteristics as well as the mass flow rate of fuel in the arc region. For example, an increase in arc current produces an increase in the number of particles generated as well as the maximum size of the particles produced. It is believed that the particles should interact at the nucleation stage, that they should be small enough to have low thermal inertia, and produce large radiating surface area per unit mass. The particles are also preferably completely oxidized before leaving the combustion area.

In will be understood that turbulent diffusion flame 36 is produced by virtue of the spark ignition of the associating fuel and oxidant gas, such as air or oxygen-enriched air, by the electric arc. The oxidant gas, preferably air provided by blower 60, is flowed through oxidant gas passage 61 and associates with the fuel issuing from outlet 144, the latter containing the entrained carbonaceous particles, to form turbulent diffusion flame 36. As will be appreciated by those skilled in the art, air entrainment at the base of a conventional turbulent diffusion flame can cause lift-off and blow-out which reduce the effective turn-down ratio. In the present invention, not only is flame stabilization brought about by increased luminous radiation, but also the pyrolytically-formed hydrogen atoms and molecular fragments increase the critical burning velocity in those flame regions which pre-mixed burning of fuel and air would otherwise limit flame stability. Accordingly, the present invention improves combustion stability, thus improving turn-down ratio, as well as provides an increase in combustion intensity, i.e., heat release rate per unit volume.

As stated, the electric arc produces ignition, and the flame continues to burn until the fuel and/or oxidant streams are interrupted. Since turn-down ratio is significantly increased in the present invention, interruption of the arc may extinguish turbulent diffusion flame 36 at very low or high fuel velocities. Thus, it is important to provide reliable electric power source. It is preferred that a DC power source be provided in which standard smoothing techniques are used, including increased capacitance and inductance. Since a high-voltage trigger may be used to initiate the arc, current swings too close to zero should be monitored for stability. Current swings too high may cause $i^2r$ heating which affects electrode longevity.

By generating heat-radiative particles in this manner, the luminous radiant heat output of turbulent diffusion flame 36 is substantially enhanced.

It is known that there is a correlation between the maximum combustion temperature and the formation of nitric oxides, with the higher temperatures producing greater nitric oxides. By enhancing the luminous radiant heat output from the flame, heat is more rapidly dissipated from the flame than from a similar flame having a low luminous radiant heat output. The reduction in the maximum flame temperature in turn reduces nitric oxide emissions in the combustion gases. Nitric oxide reduction occurs as the direct result of radiative cooling of the flame brought about by the introduction of the plasma-generated, carbonaceous heat-radiative particles.

As will be appreciated by those skilled in the art, considerable heat is generated by the electric arc and thus means for cooling plasma-assisted combustion burner 34 is provided. A coolant, such as water, is circulated through coolant passage 134 and coolant passage 84. Coolant in coolant passage 134 serves to dissipate heat from anode housing 106, anode support 100, and annular anode 112. Similarly, coolant moving through coolant passage 84 serves to dissipate heat from cathode push rod 80, cathode support 94 and cathode 96. As will be appreciated by those skilled in the art, the material from which cathode 96 is formed will have a characteristic thermionic work function. It will also be appreciated that cathode 96 will erode to some extent, an attribute which is minimized in the most preferred embodiment of the present invention by rotating the electric arc as previously described. The heat generated by turbulent diffusion flame 36, and referring now to FIG. 1 of the drawings, is transferred to heat exchange jacket 44 and then to the heat exchange medium in passage 46. As stated, the heat exchange medium is flowed through passage 46 by way of inlet 50 and outlet 48. Heat can then be extracted from the heat exchange medium for any suitable purpose.

Figure 5:
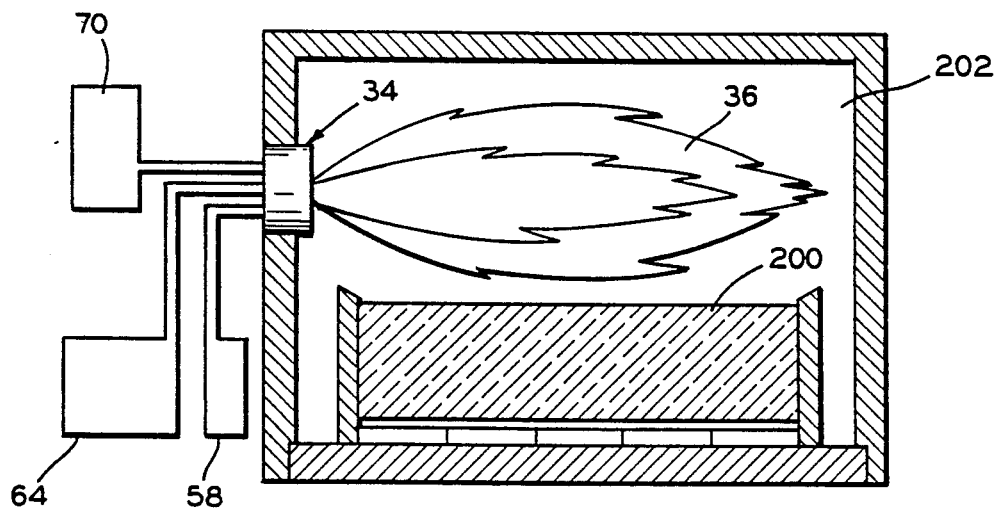
FIG. 5 illustrates diagrammatically a plasma-assisted combustion system for use in direct heat transfer to a material to be thermally processed.

Referring now to FIG. 5 of the drawings, in another embodiment the present invention is used to process a material by generating turbulent diffusion flame 36 having enhanced luminous heat radiative properties and transferring heat from the flame directly to the material to be processed. As shown in FIG. 5, in this aspect the present invention is illustrated for use in the treatment of a material 200 being directly processed by the flame inside a combustion chamber 202. Again, fuel source 58, coolant circulation system 70, power source 64, and plasma-assisted combustion burner 34 are shown somewhat diagrammatically. Thus, an apparatus for transferring heat from a turbulent diffusion flame in which the luminous radiant output is enhanced by the pyrolytic formation and introduction of heat radiant bodies into the flame, wherein the heat is transferred directly to a material to be processed is provided by the present invention, as well as a method of treating materials in this manner.

Figure 6:
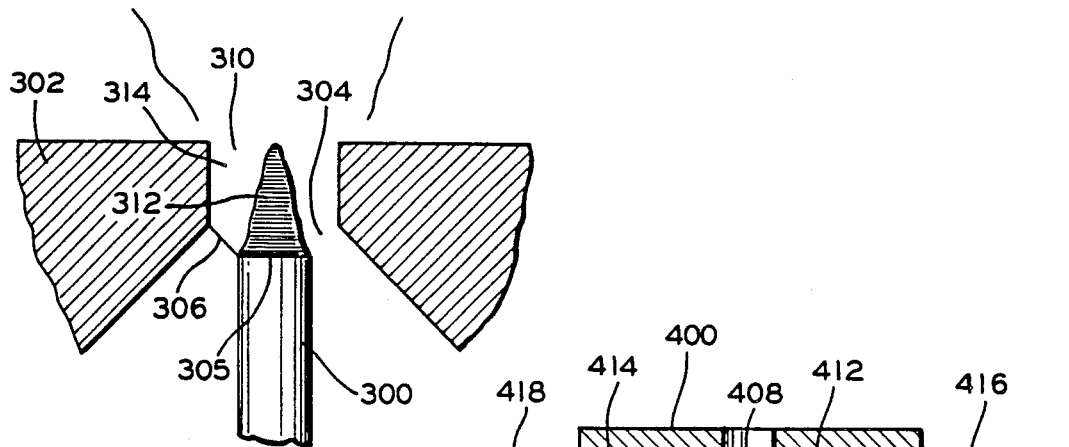
FIG. 6 depicts carbon pinnacle formation on a cathode.

In another embodiment of the present invention, and referring to FIGS. 2 and 6 of the drawings, plasma-assisted combustion burner 34 is provided with means for preventing the deposition of pyrolytically formed materials on the end of cathode 96 adjacent anode 112. Cathode 300 and annular 302 are seen in FIG. 6 which correspond to the cathode and anode of plasma-assisted combustion burner 34 as illustrated in FIGS. 2 through 4 of the drawings, however, without secondary gas supply line 116 and channel 128. Arc gap 304 is again provided between plane-end 305 of cathode 300 and the surrounding surfaces of annular anode 302. As will be appreciated from the previous explanation of the operation of plasma-assisted burner 34, a hydrocarbon fuel gas passes through arc gap 304 and exits annular anode 302 at outlet 310. Hence, outlet 310 is again in the nature of a nozzle outlet. Here, the electric arc generated between cathode 300 and annular anode 302 is shown with reference numeral 306. It has been found that during operation of plasma-assisted burner 34, the pyrolytic production of carbonaceous heat radiant particles results in a deposit of these particles on plane-end 305 of cathode 300, shown as carbon pinnacle 312 in FIG. 6. The formation of carbon pinnacle 312 interferes with the stability of the turbulent diffusion flame by destabilizing the inter-electrode spacing. In other words, as carbon pinnacle 312 forms, it provides an irregular conduction path along which electric arc 306 migrates. This decreases the rate of formation of carbonaceous heat radiative bodies and reduces the turn-down ratio of plasma-assisted combustion burner 34. As will be known by those skilled in the art, the turn-down ratio is based on the range of fuel flow rate which can be maintained without extinguishing the flame. Moreover, it has been found that carbon pinnacle 312 may increase in size such that bore 314 of annular anode 302 is occluded, causing interruption of the primary fuel flow sufficient to extinguish the flame. In one embodiment of the present invention, formation of carbon pinnacle 312 is prevented by providing secondary gas supply line 116 and secondary gas bore 128 which, as stated, is in communication with the central bore of annular anode 112. As will be more fully explained, other means for preventing the formation of carbon pinnacle 312 are also provided by the present invention.

Referring now to FIG. 4 of the drawings, in this embodiment of plasma-assisted combustion burner 34, a secondary jet of gas flows from secondary gas bore 128 into central bore 124 of annular anode 112 toward plane-end 130 of cathode 96. It is preferred that this secondary gas flow comprise a hydrocarbon fuel, for example, natural gas, which accordingly increases the mass flow rate of the fuel in a manner which is independent of the arc-sensitive flow. Secondary flow of fuel gas facilitates increased natural gas process flow per kw electrical power and provides better control of the arc motion for more stable operation. It also aids in primary flow mixing. Alternatively, the secondary gas flow may comprise a non-hydrocarbon fuel such as hydrogen, with the carbonaceous particles still being derived from the primary flow of hydrocarbon gas through the arc. It should also be noted that the secondary gas flow cools the plane surface of the cathode somewhat which may permit the use of larger or less costly cathodes. Although the precise mechanism by which this secondary gas jet prevents the formation of a carbon pinnacle on the end of cathode 96 is not known, it is believed that any particles depositing on plane-end 130 are displaced by the motion of the secondary gas flow. It will be understood that plane-end 130 is essentially a stagnation zone. Particles which move into this secondary gas current are propelled into the primary gas current issuing from fuel gas chamber 98. Thus, the velocity of gas issuing from secondary gas bore 128 should be sufficient to in essence penetrate the primary gas flow across which the secondary gas flow must pass to reach plane-end 130 of cathode 96, in other words, sufficient to cause gas motion in the stagnation zone to mobilize the particles. Where secondary gas bore 128 has a diameter of from about 1.0 to about 1.5 mm, a gas velocity of from about 15 to about 30 meters/second is sufficient where the primary flow of gas has a velocity of from about 3 to about 15 meters/second in one embodiment. Other values outside these ranges may be appropriate in a specific application.

Figure 7:
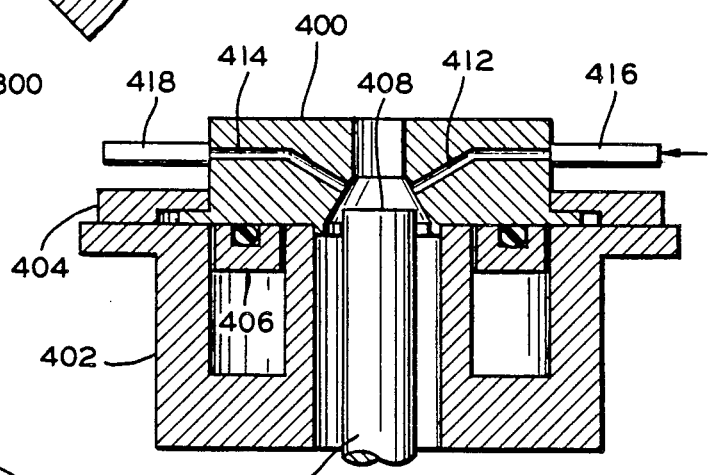
FIG. 7 illustrates a portion of the plasma-assisted combustion burner of the present invention in cross-section in that embodiment having multiple secondary gas channels.
Figure 8:
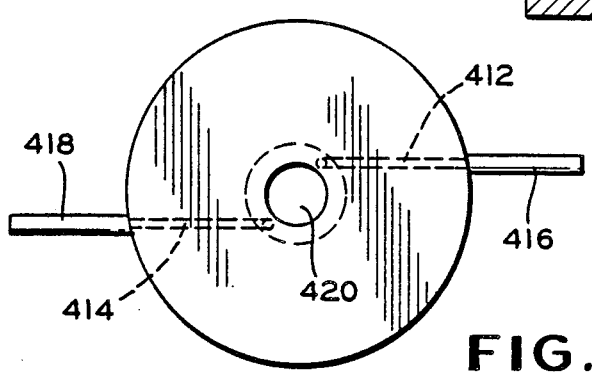
FIG. 8 is a plan view of the apparatus shown in FIG. 7.

More preferably, and referring now to FIGS. 7 and 8 of the drawings in which a slightly modified arrangement of annular anode 400, anode support 402, retaining collar 404 and magnet 406 is provided, plane-end 408 of cathode 410 is maintained free of a carbon deposit by two secondary gas jet streams provided by channels 412 and 414. Each channel is again supplied with a secondary gas supply line 416 and secondary gas line 418 respectively. Most preferably, as seen best in FIG. 8, secondary supply channels 412 and 414 are arranged tangentially with respect to central bore 420 of annular anode 400 in order to create a secondary gas vortex to prevent the accumulation of carbonaceous particles on plane-end 408 of cathode 410. That is, by introducing the secondary gas tangentially in this manner, a whirling motion is imparted to the gas which assists in the prevention of particle deposit on the cathode. The secondary gas jets are still most preferably directed at the surface of plane-end 408 of cathode 410.

Figure 9:
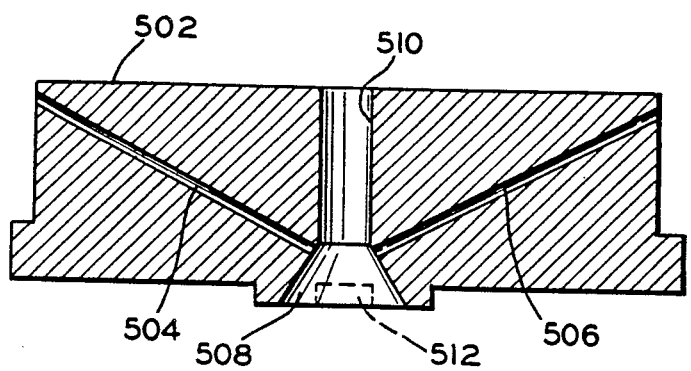
FIG. 9 is a cross-section of an anode for use in the present invention.
Figure 10:
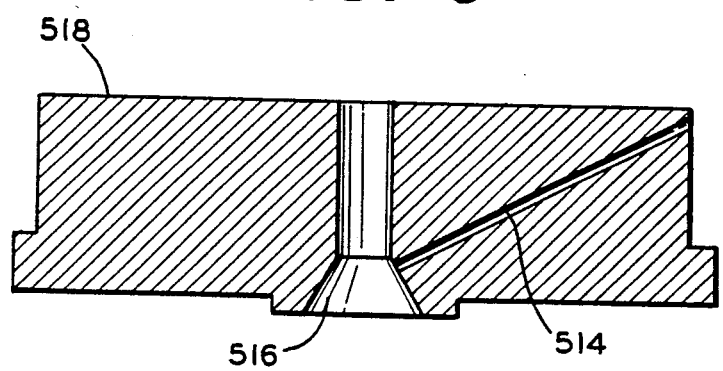
FIG. 10 is a cross-section of another anode for use in the present invention.
Figure 11:
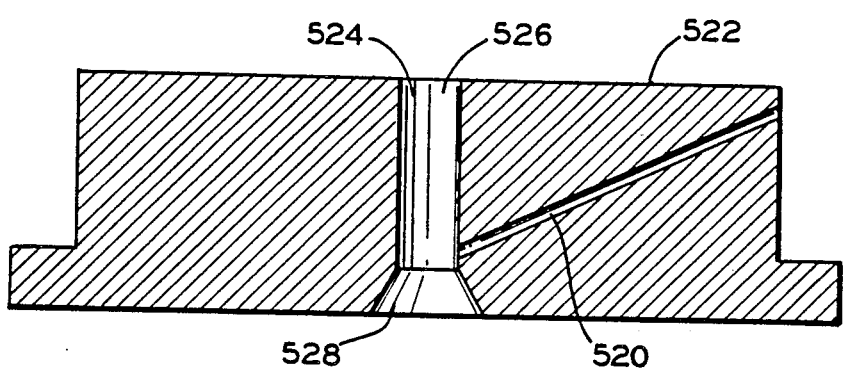
FIG. 11 is a cross-section of another anode for use in the present invention.
Figure 12:
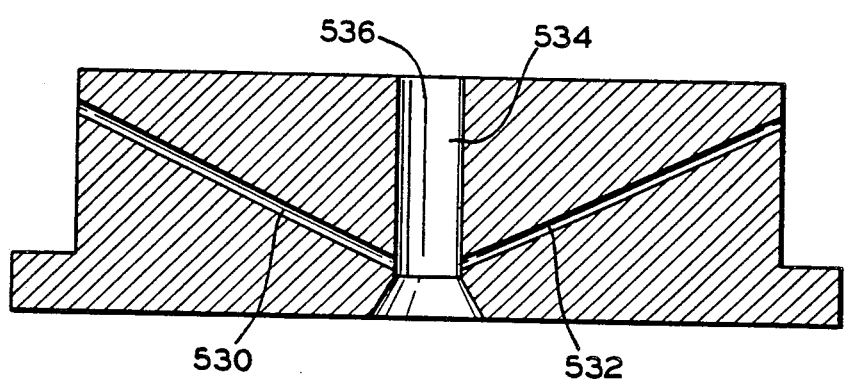
FIG. 12 is a cross-section of another anode for use in the present invention.

Various other arrangements of secondary gas annular anode geometries are shown in FIG. 9 through 12 of the drawings. In FIG. 9, annular anode 502 is again provided with two secondary gas bores 504 and 506 which lead directly into conversing throat portion 508 of bore 510 in which a portion of cathode 512 is shown in phantom unlike the secondary gas bores shown in the previous embodiments, secondary gas bores 504 and 506 are in straight line for ease of fabrication. In FIG. 10, a single linear secondary gas bore 514 is shown, again in communication with the converging throat portion 516 of annular anode 518. A slightly different configuration is shown in FIG. 11 in which a single secondary gas supply channel 520 is shown extending through annular anode 522 and terminating in straight bore portion 524 of central bore 526 rather than in converging portion 528 as previously shown. In FIG. 12, twin secondary gas supply lines 530 and 532 are shown again in communication with straight bore portion 534 of central bore 536.

In still another embodiment, the means for preventing carbon pinnacle formation on the cathode comprises the use of a carbon electrode as the cathode. Although carbon cathodes are well known, their use in plasma-assisted combustion burner 34 is suitable to prevent the formation of a carbon pinnacle on the cathode end during pyrolytic formation of carbonaceous heat radiative particles in accordance with the present invention. This is true not only with a plane-ended cathode, but also with rod-shaped pointed cathodes Carbon cathodes which are suitable for use in the present invention are available from a number of sources, including McMaster-Carr Company. One suitable graphite cathode has an apparent density of about 1.85 G/CC, a hardness value of 60, and a maximum grain size of 0.0007 inches. Of course the length and diameter of the cathode will be dictated by the dimensions of the components of plasma-assisted combustion burner 34.

Figure 13:
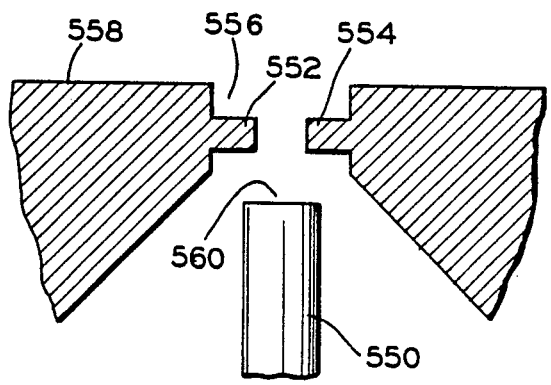
FIG. 13 is a cross-section of a portion of the present invention in which baffles are utilized as means for preventing carbon pinnacle formation.

In still another embodiment of the present invention, and referring now to FIG. 13 of the drawings, still another means for preventing the formation of a carbon pinnacle on cathode 550 comprises a plurality of baffles 552 and 554 in central bore 556 of annular anode 558. Baffles 552 and 554 serve to redirect a portion of the primary fuel stream such that a back current is developed which creates turbulence in stagnation zone 560 sufficient to prevent the accumulation of carbonaceous particles thereon.

Figure 14:
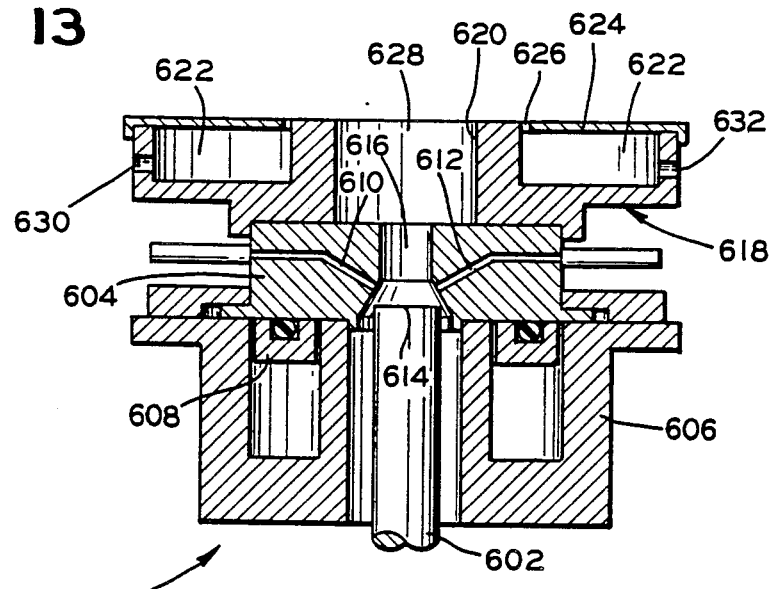
FIG. 14 is a cross-section of a portion of a plasma-assisted combustion burner in accordance with the present invention having a tertiary gas flow cap.

In still another embodiment of the present invention, an apparatus and method are provided by which the residence time of heat-radiative, oxidizable particles may be regulated. Referring now to FIG. 14 of the drawings, a plasma-assisted burner assembly 600 is shown for use in a system similar to that shown in FIGS. 1 through 3 of the drawings. That is, only a portion of the components are illustrated in FIG. 14 for simplicitly in description. Accordingly, cathode 602 is shown spaced from annular anode 604 which is supported on anode support 606 which in turn houses annular magnet 608. In this embodiment, assembly 600 includes secondary gas jet channels 610 and 612 by which carbon pinnacle formation on cathode 602 is prevented. A primary fuel gas is flowed through assembly 600 in the manner previously described such that it passes through the arc gap thus forming carbonaceous particles which are entrained in the primary fuel stream. As previously explained, a secondary stream of gas is flowed through channels 610 and 612 which are directed at plane-end 614 of cathode 602 to prevent carbon pinnacle formation. The fuel gas then exits outlet 616.

In the previously described constructions, oxidant gas associates with the fuel stream promptly after the fuel stream issues from outlet 616. As will be appreciated by those skilled in the art, the carbonaceous heat radiative bodies which have been pyrolytically formed will be distributed throughout the fuel stream. Those particles which are adjacent the interface at which the oxidant gas associates with the fuel gas have a tendency to oxidize by virtue of the heat of reaction and the presence of the oxidant. Since one of the purposes of the heat radiative bodies is to enhance the luminous radiant output of the turbulent diffusion flame which is so formed, it is desirable to delay the oxidation of these particles for a period of time such that they can fully perform their heat-radiative function. This is achieved in this embodiment of the present invention by tertiary flow cap 618.

Figure 15:
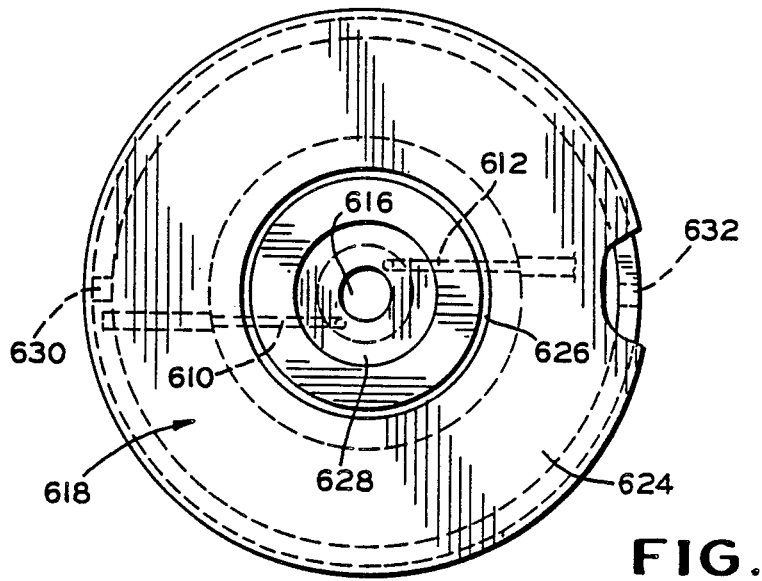
FIG. 15 is the apparatus of FIG. 14 in plan view.
Figure 16:
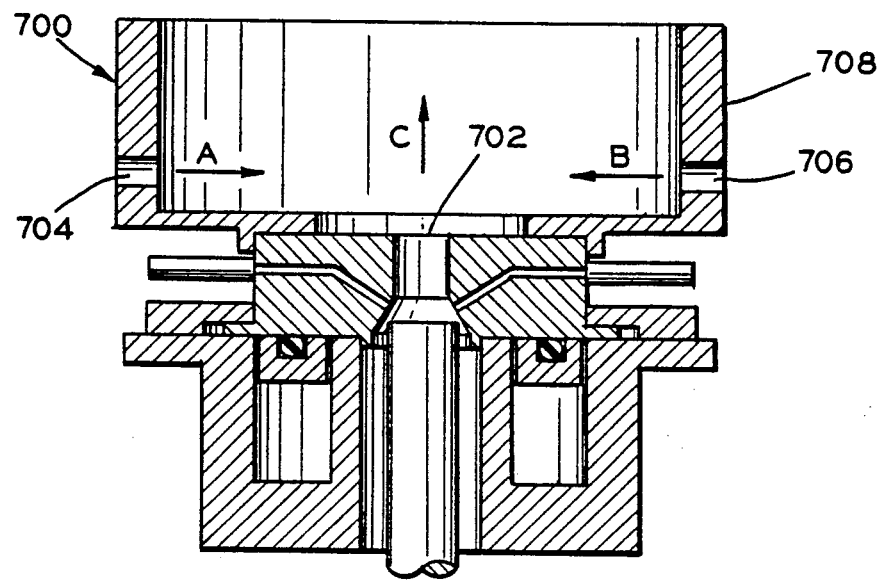
FIG. 16 illustrates a portion of the plasma assisted combustion burner of the present invention in cross-section with an alternative tertiary gas flow cap.

Tertiary flow cap 618 has an annular construction which is best seen in FIG. 15 and which includes body or base portion 620 that defines annular chamber 622. Chamber 622 is further defined by plate 624 which is arranged such that a circumferential gap or outlet 626 is created. Bore 628 of annular tertiary flow cap 618 is seen in alignment with outlet 616 of annular anode 604. Thus, as the fuel stream exits outlet 616 having the entrained carbonaceous heat-radiative bodies therein, it passes through bore 628 of tertiary gas flow cap 618. A tertiary gas supply is introduced into chamber 622 via one or more channels 630 and 632. The tertiary gas then flows outwardly through circumferential outlet 626 forming a protective sheath around the fuel stream flowing through bore 628. This circumferential tertiary gas flow is a non-oxidant gas, preferably a hydrocarbon fuel gas such as natural gas or a non-hydrocarbon fuel gas such as hydrogen. Again, heat-radiative particles are preferably formed by pyrolysis of a primary fuel stream of hydrocarbon gas. In this manner, the fuel stream issuing from bore 628 in which the carbonaceous heat-radiative bodies reside is not immediately associated with oxidant gas, but rather is protected by the tertiary gas flow. Where the tertiary gas is a fuel gas, the tertiary fuel gas associates with the oxidant gas producing a combustion reaction which is spaced slightly away from the heat-radiative bodies. Heat-radiative bodies which would otherwise oxidize as previously described, are thereby protected. The extent of this protection and thus the period of delayed oxidation of the particles is determined in part by the nature of the tertiary gas, the height of tertiary gas cap 618, the volume of tertiary gas issuing from circumferential outlet 626 as well as the lateral distance between bore 628 and circumferential outlet 626. It has been found that increasing the lateral distance between bore 628 and circumferential outlet 626 provides greater delay of oxidation and thus a greater residence time of the heat-radiated bodies. Tertiary flow in the manner of the present invention provides a number of benefits. Where the tertiary gas flow is a fuel gas, the amount of fuel gas processed per kw of electrical power is increased. Furthermore, with appropriate combustion air flow matching tertiary flow provides a more uniform temperature field from which particles can radiate. The tertiary flow preferably inhibits premature oxidation where particle number density is greatest. Tertiary flow generally facilitates more stable operation of the apparatus and very importantly enables a significant reduction in nitric oxide emissions.

Figure 17:
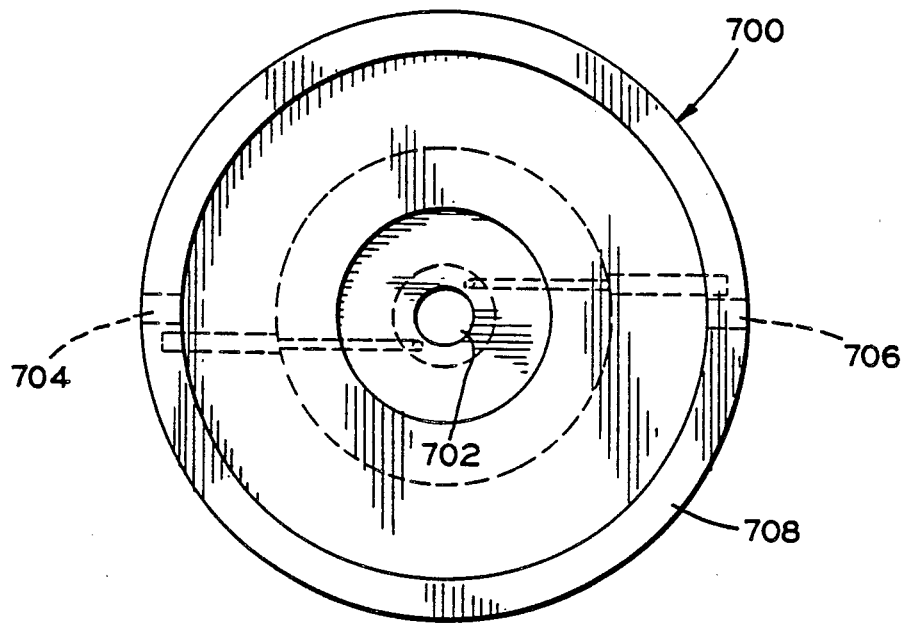
FIG. 17 is the apparatus shown in FIG. 16 in plan view.
Figure 18:
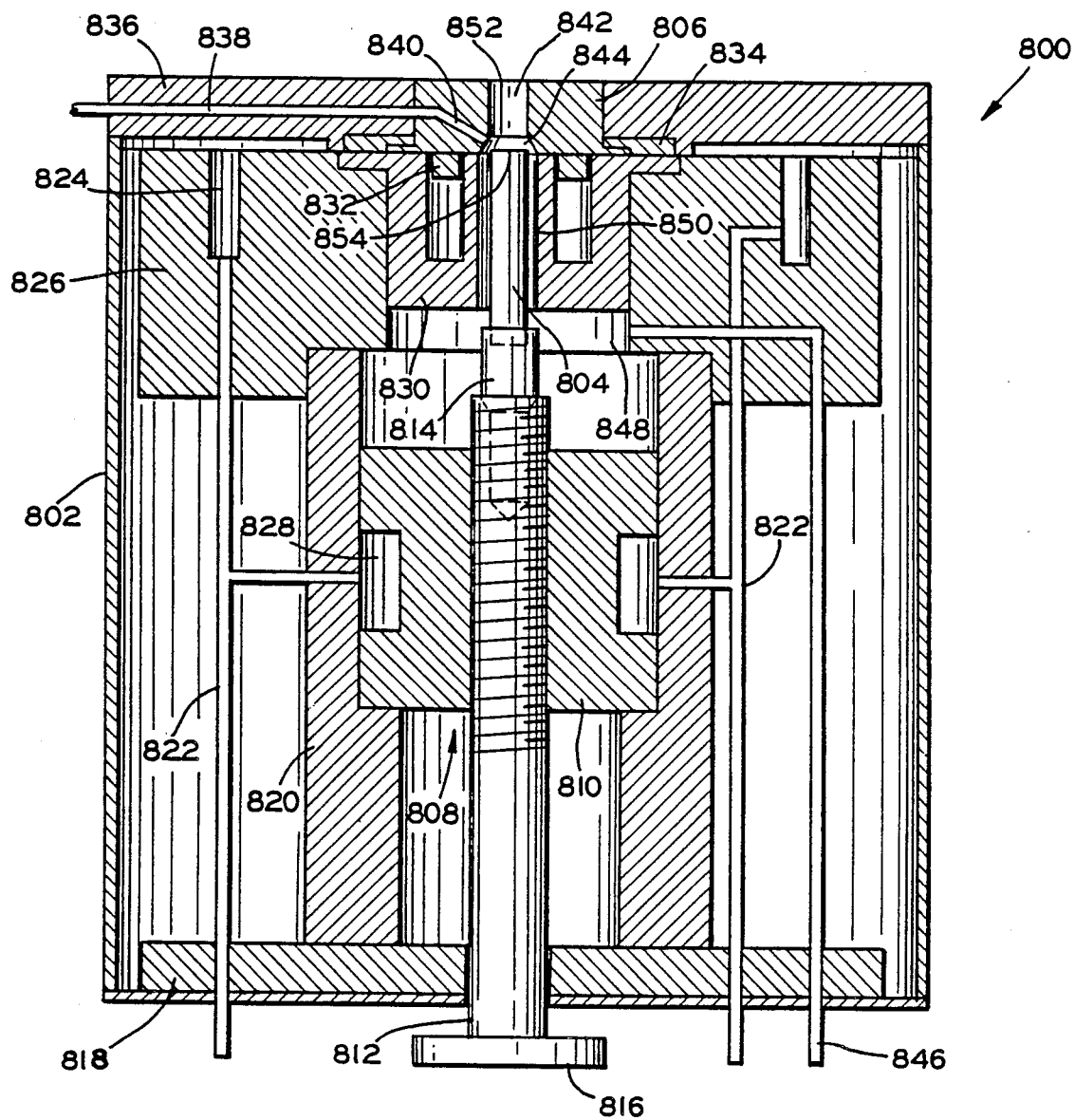
FIG. 18 is a cross-section of an apparatus in accordance with the present invention for the treatment of materials.

It will be noted that in this embodiment, the flow of tertiary gas is in a direction parallel to the flow of fuel issuing from outlet 616. As illustrated in FIGS. 17 and 18 of the drawings, tertiary gas flow cap 700 has a different configuration such that the tertiary gas is introduced perpendicular to the flow of fuel gas issuing from outlet 702. In this alternative embodiment, a plurality of channels 704 and 706 are provided in body 708, only two of which are shown in the drawings. The tertiary gas then flows in the direction of arrows A and B and encounters the main gas stream flowing in the direction of arrow C. As will be appreciated by those skilled in the art, the tertiary gas then associates with the main gas flow where upon it is carried along by the main gas stream in direction C. As with the circumferential tertiary gas flow created in the apparatus as shown in FIGS. 14 and 15, the tertiary gas flow creates a protective envelope which delays oxidation of the heat-radiative bodies. Again, this mechanism also assists in the reduction of nitric oxide emissions, where it has been found that tertiary flow is extremely beneficial.

As will be known by those skilled in the art, depending upon the carbon-to-hydrogen ratio of the fuel gas, carbonaceous heat-radiative parties are formed in most turbulent combustion flames and it is contemplated within the scope of the present invention that tertiary gas flow cap 618 and 700 may be utilized to delay the premature oxidation of these particles in an apparatus which does not include enhancement by the electrical pyrolysis mechanism described herein.

In still another embodiment of the present invention, a novel method and apparatus are provided for the thermal treatment of materials in which the cathode is continuously purged of any materials which may otherwise deposit on the cathode. Referring now to FIG. 18, apparatus 800 for treating a flow of materials is shown generally and includes housing 802 having cathode 804 and annular anode 806. Housing 802 is cylindrical and contains cathode assembly 808 having cathode support block 810 through which cathode push-rod 812 extends, the latter being in engagement with cathode support 814. As in previous embodiments, cathode push-rod 812 is helically received within cathode support block 810 such that the inter-electrode distance between cathode 804 and anode 806 can be adjusted manually by turning knob 816. Base plate 818 is provided to which cylindrical housing 820 is attached at one end. A network of coolant pipes 822 are provided by which a coolant is circulated through annular passage 824 of anode housing 826 and coolant passage 828 of cathode support block 810.

Once again, annular anode 806 is supported by anode support 830 which is equipped with annular magnet 832. A retaining collar 834 secures annular anode 806 on anode support 830. In this embodiment, cap 836 is provided through which purging gas supply line 838 extends. Purging gas line 838 includes anode portion 840 which extends through annular anode 806, terminating at and in communication with anode bore 842.

In operation, and in accordance with the method of the present invention, cathode 804 and annular anode 806 are electrically energized by the appropriate circuitry an electrical leads (not shown) to generate an electric arc which spans arc gap 844. A material to be treated is introduced through supply line 846, through chamber 848 and bore 850 of anode support 830, whereupon the material passes through the electric arc spanning arc gap 844 and exits bore 842 at outlet 852. To prevent the build up of materials, pyrolytically formed or otherwise, on plane-end 854 of cathode 804, a gas is flowed through passage or channel 838 at a velocity sufficient to forcibly impinge upon plane-end 854. In this manner, materials which would otherwise deposit on plane-end 854 of cathode 804 are continuously purged from the surface.

While particular embodiments of this invention are shown and described herein, it will be understood, of course, that the invention is not to be limited thereto since many modifications may be made, particularly by those skilled in this art, in light of this disclosure. It is contemplated therefore by the appended claims to cover any such modifications that fall within the true spirit and scope of this invention. For example, the above-described embodiments of the invention have related to a burner producing a turbulent diffusion flame, i.e., a flame produced when the fuel and oxidant are not premixed. It can be appreciated that the plasma particle-generating device can be separate from a nonluminous premixed flame. The plasma generated particles can be injected into the flame to increase the luminous output.

What is claimed is:

1. A combustion apparatus, comprising: a pair of spaced electrodes defining a gap; means for conveying an oxidant free fuel through said gap; means for establishing a continuous arc across said gap to pyrolytically form particles dispersed in such conveyed fuel, means for preventing the deposit of such pyrolytically formed particles on one of said electrodes; and means for combining an oxidant with the fuel and dispersed particles to form a combustible mixture having particles dispersed therein.

2. The invention recited in claim 1, wherein said means for preventing the deposit of pyrolytically formed particles on said one electrode includes means for directing a gaseous jet towards said one electrode.

3. The invention recited in claim 1, wherein said one electrode comprises a rod-shaped cathode and the other of said electrodes comprises an annular anode having a converging throat in flow communication with a straight bore passage, one end of said cathode being coaxially disposed in said converging throat.

4. The invention recited in claim 3, wherein said one end of said cathode has a substantially flat terminal surface perpendicular to a longitudinal axis extending along said rod-shaped cathode and through said straight bore passage and wherein said means for preventing the deposit of pyrolytically formed particles on said one electrode includes means for directing a gaseous jet of the fuel towards said flat terminal surface.

5. The invention recited in claim 4, further including means for rotating an electric arc struck between said electrodes.

6. The invention recited in claim 5, wherein said arc rotating means further includes means in association with said electrodes for applying a magnetic force to the region of said gap.

7. The invention recited in claim 6, wherein said cathode is disposed within said fuel conveying conduit.

8. An apparatus for generating recoverable thermal energy, comprising:
   means for conveying an oxidant free fuel to an electrical pyrolysis zone;
   a pair of spaced electrodes defining a gap coextensive with said electrical pyrolysis zone;
   means for conveying an electrical current to said spaced electrodes sufficient to strike and maintain an electric arc across said gap, said arc having electrical characteristics adapted to cause pyrolysis of a portion of said fuel to form heat-radiative bodies entrained in said fuel;
   a nozzle in flow communication with said means for conveying said fuel, said nozzle having a nozzle opening for the passage therethrough of said fuel gas having said entrained heat-radiative bodies;
   a combustion chamber in association with said nozzle opening such that said fuel having said entrained heat-radiative bodies discharged from said nozzle opening temporarily resides within said combustion chamber;
   means for establishing combustion of said fuel and said entrained heat-radiative bodies in said combustion chamber including means for conveying an oxidant to said chamber; and
   means in association with said combustion chamber for recovering heat generated in said combustion chamber.

9. The invention recited in claim 8, further including means for substantially preventing the deposit of pyrolytically formed materials on one of said electrodes.

10. The invention recited in claim 8, wherein said pair of electrodes comprise an annular anode having a converging throat in flow communication with a straight bore passage through said annular anode and a cathode at least partially disposed coaxially within said converging throat.

11. The invention recited in claim 10, wherein said converging throat and said straight bore passage comprise said nozzle.

12. The invention recited in claim 10, wherein said means for conveying said fuel includes a fuel passage leading into said converging throat and said straight bore passage of said anode, said cathode being at least partially disposed within said fuel passage.

13. The invention recited in claim 12, wherein said means for conveying an oxidant gas conveys said oxidant gas to the region of said nozzle opening in said combustion chamber.

14. The invention recited in claim 12, wherein said cathode is generally rod-shaped and has a terminal portion with an edge providing a continuous closed annular path disposed in said converging throat.

15. An electric arc apparatus for the pyrolytic treatment of a material, comprising a pair of spaced electrodes comprising an anode and a cathode defining a gap therebetween, said cathode having an end surface, said anode having a bore therethrough adapted to direct a stream of gas incident upon said end surface of said cathode, and means for discharging a stream of gas through said anode opening at said end surface to prevent the deposit of substances thereon.

16. The invention recited in claim 15, wherein said anode is an annular anode having a second passage, said second passage being adapted for the flow of said material therethrough after said material passes through said gap.

17. The invention recited in claim 16, wherein said cathode includes a continuous annular edge adjacent said anode.

18. The invention recited in claim 17, further including means for generating a magnetic field of predetermined intensity in said gap for producing movement of an electric arc struck between said electrodes along said annular edge.

19. A method of enhancing the thermal radiation of a combustion flame, comprising:
   electrically ionizing a portion of a primary continuous stream of oxidant free hydrocarbon gaseous fuel flowing between a pair of spaced electrodes to pyrolytically form heat-radiative bodies entrained in said primary stream of hydrocarbon fuel;
   contacting said primary stream of said hydrocarbon fuel having said entrained heat-radiative bodies with an oxidant gas;
   combusting said hydrocarbon fuel and said oxidant gas to form a combustion flame in which heat energy is liberated, said heat energy being radiated by said heat-radiative bodies; and
   regulating the rate at which said heat-radiative bodies are pyrolytically formed to control the amount of radiative heat produced by said flame.

20. The method recited in claim 19, further including the step of oxidizing said heat-radiative bodies with said combustion flame.

21. The method recited in claim 19, further including the step of providing heat exchange means for recovery of heat from said combustion flame and said heat-radiative bodies.

22. The method recited in claim 19, wherein said pair of electrodes comprise a cathode and an annular anode having a passage therethrough, and further comprising the step of directing said primary stream of hydrocarbon gas having said entrained heat-radiative bodies through said passage of said annular anode.

23. The method recited in claim 22, wherein a secondary jet of gas is directed through a passage in an anode at an end surface of a cathode to prevent the deposit of said heat-radiative bodies on said end surface.

24. The method recited in claim 19, further including the step of preventing the deposition of pyrolytically formed substances on at least one of said electrodes.

25. The method recited in claim 24, wherein said means for preventing the deposit of said pyrolytically formed substances on said electrode includes the step of directing a secondary jet of gas at said electrode of sufficient velocity to prevent said deposit of said substances on said electrode.

26. The method recited in claim 25, wherein said hydrocarbon fuel is natural gas and said oxidant gas is selected from the group consisting of air and oxygen-enriched air.

27. The method recited in claim 26, wherein said secondary jet of gas is selected from the group consisting of natural gas and hydrogen.

28. A method of enhancing radiation heat transfer from a natural gas flame, said method including the following steps:
(a) generating carbon particles in situ by electrical pyrolysis of natural gas;
(b) seeding a natural gas flame with said carbon particles thereby enhancing luminous radiation heat transfer of said natural gas flame; and
(c) substantially completely oxidizing said carbon particles in said natural gas flame.

29. The method recited in claim 28, wherein said seeding step includes entraining said carbon particles in a stream of natural gas directed into said flame.

30. The method recited in claim 28, characterized in that said method includes generating said carbon particles in a plasma generating apparatus, said apparatus including an annular anode and an axially disposed cathode, said method including generating an arc between said cathode and said anode, and introducing natural gas around said cathode and through said anode to pyrolize a portion of said natural gas and to form said carbon particles.

31. The method recited in claim 30, wherein said cathode has a generally flat end portion adjacent said anode, and said method includes directing a stream of natural gas toward the flat end of said cathode, thereby preventing carbon particles from depositing on said flat end of said cathode.

32. The method recited in claim 28, wherein said carbon particles are generated with a particle size of less than about 0.25 microns, and including the steps of suspending said carbon particles in a stream of natural gas, directing such natural gas stream and said suspended carbon particles into said flame, and substantially oxidizing said carbon particles in said flame.

33. A method of enhancing the heat transfer of a natural gas flame, said method including the following steps:
(a) generating particles of carbon by electrical pyrolysis generation in an oxidant free primary natural gas stream utilizing an apparatus having a cathode with a substantially flat end, an anode having a bore coaxially aligned with said cathode, means for generating an arc between said cathode and said anode and means introducing natural gas around said cathode and through said anode bore to thereby generate said carbon particles dispersed in said natural gas stream;
(b) establishing a natural gas flame from said natural gas stream with said dispersed carbon particles and an oxidant, said carbon particles enhancing radiation heat transfer from said natural gas flame; and
(c) substantially completely oxidizing said carbon particles in said natural gas flame.

34. The method recited in claim 33, wherein said method further includes directing a secondary stream of natural gas against said flat end of said cathode, entraining particles of carbon in said secondary stream of natural gas, and directing said carbon particles into said natural gas flame.

35. A method for preventing the deposit of pyrolytically formed substances on an electrode in a plasma generating apparatus, comprising the steps of:
generating an electric arc extending between a pair of spaced electrodes;
passing a material to be ionized through said electric arc, said arc pyrolytically forming substances dispersed in said material; and
preventing the deposit of pyrolytically formed substances on a surface on at least one of said electrodes by directing a jet of gas at said surface in a manner sufficient to prevent said pyrolytically formed substances from depositing on said at least one electrode 36. The method recited in claim 35, wherein said material is a hydrocarbon fuel and said pyrolytically formed substances comprise carbon particles.

37. The method recited in claim 35, wherein said pair of electrodes includes a rod-shaped cathode having a flat end perpendicular to the longitudinal axis of said cathode, and wherein said jet of gas is directed to impinge on said flat end of said cathode.

38. The method recited in claim 35, wherein said jet of gas is passed through a bore in an anode.

39. A combustion apparatus comprising:
a pair of spaced electrodes defining a gap across which an electric arc may be established;
means for establishing a continuous arc across said gap;
means for conveying an oxidant free hydrocarbon fuel as a stream through said gap to ionize a portion of said hydrocarbon fuel and to pyrolytically form particles dispersed in said hydrocarbon fuel;
means for introducing said hydrocarbon fuel and said dispersed particles into a combustion flame downstream of said gap; and
means for introducing a second stream of gas into said combustion flame to delay the oxidation of at least some of said pyrolytically formed particles.

40. The invention recited in claim 39, further including means for preventing deposit of said pyrolytically formed particles on at least one of said electrodes.

41. The invention recited in claim 40, wherein said means for preventing deposit of said pyrolytically formed particles includes means for directing a gas jet to the surface of said one electrode.

42. The invention recited in claim 41, wherein said gas jet is a hydrocarbon gas.

43. The invention recited in claim 39, wherein said means for introducing said second stream of gas into said combustion flame downstream of said gap includes means for flowing said second stream of gas through an annulus surrounding said combustion flame.

44. A method for oxidizing pyrolytically formed particles in a combustion flame and for reducing nitric oxide emissions, comprising the steps of:

flowing an oxidant free hydrocarbon fuel through an electric arc extending between a pair of spaced electrodes at an arc gap to generate pyrolytically formed particles dispersed in said fuel;

creating a combustion flame downstream from said arc gap with said fuel and dispersed particles; and introducing hydrocarbon fuel into said combustion flame downstream of said arc gap to delay oxidation of said pyrolytically formed particles by said combustion flame.

45. The method recited in claim 44, further comprising the step of preventing deposit of said pyrolytically formed particles on at least one of said electrodes.

46. The method recited in claim 45, wherein the step of preventing deposit of said pyrolytically formed particles includes directing a gas jet to the surface of said one electrode.

* * * * *